(12) United States Patent
Klosterberg et al.

(10) Patent No.: US 11,493,004 B2
(45) Date of Patent: Nov. 8, 2022

(54) INTERNAL COMBUSTION ENGINE INCLUDING EXHAUST GAS RECIRCULATION

(71) Applicant: DEUTZ Aktiengesellschaft, Cologne (DE)

(72) Inventors: Johannes Klosterberg, Swisttal (DE); Marco Sliwa, Siegburg (DE); Tobias Kurt, Dormagen (DE); Oliver Schmitz, Huerth (DE)

(73) Assignee: Deutz Aktiengesellschaft, Cologne (DE)

( * ) Notice: Subject to any disclaimer, the term of this patent is extended or adjusted under 35 U.S.C. 154(b) by 0 days.

(21) Appl. No.: 17/606,128

(22) PCT Filed: Mar. 10, 2020

(86) PCT No.: PCT/EP2020/000058
§ 371 (c)(1),
(2) Date: Oct. 25, 2021

(87) PCT Pub. No.: WO2020/216465
PCT Pub. Date: Oct. 29, 2020

(65) Prior Publication Data
US 2022/0082067 A1 Mar. 17, 2022

(30) Foreign Application Priority Data
Apr. 25, 2019 (DE) .................... 10 2019 002 998.4

(51) Int. Cl.
*F02M 26/30* (2016.01)
*F02M 26/28* (2016.01)
(Continued)

(52) U.S. Cl.
CPC ............ *F02M 26/30* (2016.02); *F02M 26/28* (2016.02); *F02M 26/32* (2016.02); *F02M 26/41* (2016.02); *F01P 2060/16* (2013.01)

(58) Field of Classification Search
CPC ........ F02M 26/30; F02M 26/28; F02M 26/32; F02M 26/41; F01P 2060/16
See application file for complete search history.

(56) References Cited

U.S. PATENT DOCUMENTS

| 5,203,311 A | 4/1993 | Hitomi et al. |
| 6,360,702 B1 * | 3/2002 | Osada .................. F28D 7/0066 |
| | | 123/41.31 |

(Continued)

FOREIGN PATENT DOCUMENTS

| DE | 691 30976 T2 | 7/1999 |
| DE | 102004015487 A1 | 10/2005 |

(Continued)

OTHER PUBLICATIONS

International Search Report for PCT/EP2020/000058, dated May 13, 2020.

*Primary Examiner* — Hung Q Nguyen
(74) *Attorney, Agent, or Firm* — Davidson, Davidson & Kappel, LLC

(57) ABSTRACT

An internal combustion engine including a crankcase (1) and including a cylinder head is described, including at least one cylinder block, at least one planar flange surface for accommodating at least one cooler (2), at least one cooler (2), at least one coolant inlet to the cooler (2), at least one coolant outlet (8) from the cooler (2), at least one exhaust gas inlet to the cooler (2), at least one integrated exhaust gas feedthrough from the cooler (2), and at least one internal cooling section (3).

20 Claims, 3 Drawing Sheets

(51) Int. Cl.
*F02M 26/32* (2016.01)
*F02M 26/41* (2016.01)

(56) References Cited

U.S. PATENT DOCUMENTS

| | | | |
|---|---|---|---|
| 9,897,048 B2 | 2/2018 | Joisten-Pieritz et al. | |
| 10,100,716 B2* | 10/2018 | Choi | F02M 26/20 |
| 10,794,337 B2* | 10/2020 | Yang | F01P 3/20 |
| 2008/0257317 A1* | 10/2008 | Cerabone | F02M 26/32 |
| | | | 123/568.12 |
| 2009/0188477 A1* | 7/2009 | Gruner | F02M 26/32 |
| | | | 123/568.12 |
| 2013/0042840 A1* | 2/2013 | Braic | F02M 26/41 |
| | | | 123/568.11 |
| 2013/0055970 A1* | 3/2013 | Harada | F02M 26/32 |
| | | | 29/888.06 |
| 2013/0206120 A1* | 8/2013 | Yoshida | F02M 26/13 |
| | | | 123/568.12 |
| 2013/0327499 A1* | 12/2013 | Goncalves | F28F 9/24 |
| | | | 165/85 |
| 2016/0186704 A1* | 6/2016 | Murotani | F02M 26/28 |
| | | | 123/568.12 |
| 2016/0281649 A1* | 9/2016 | Joisten-Pieritz | F02M 26/32 |
| 2017/0107952 A1* | 4/2017 | Yang | F02M 26/30 |
| 2017/0138320 A1* | 5/2017 | Kim | F01P 3/02 |
| 2017/0306896 A1* | 10/2017 | Kim | F02M 26/30 |
| 2017/0328313 A1* | 11/2017 | Chu | F01P 5/10 |
| 2017/0370329 A1* | 12/2017 | Chun | F28F 1/02 |
| 2019/0186432 A1* | 6/2019 | Kim | F02M 26/30 |
| 2019/0383243 A1* | 12/2019 | Yang | F01P 3/02 |
| 2020/0080522 A1* | 3/2020 | Yang | F01P 3/12 |
| 2020/0102918 A1* | 4/2020 | Fulker | F02B 61/045 |
| 2020/0263639 A1* | 8/2020 | Yang | F02M 26/29 |

FOREIGN PATENT DOCUMENTS

| | | |
|---|---|---|
| EP | 2063097 A1 | 5/2009 |
| EP | 3073089 A1 | 9/2016 |
| JP | 2017141844 A | 8/2017 |

* cited by examiner

C-C

INTERNAL COMBUSTION ENGINE INCLUDING EXHAUST GAS RECIRCULATION

The present disclosure relates to an internal combustion engine including exhaust gas recirculation.

BACKGROUND

Such an internal combustion engine is known from DE 691 30 976 T2. This internal combustion engine includes an exhaust gas recirculation system including a distribution line, which extends in parallel to a fresh gas line. The fresh gas line includes branching fresh gas channels, which each lead to the two intake valves of a cylinder unit. The distribution line, including individual feed lines, opens into the fresh gas channels. In known exhaust gas recirculation (EGR) coolers, the flow through the cooler of the engine takes place transversely, and the cooler is situated in a kind of pocket directly in the crankcase of the engine without a dedicated housing. The transverse through-flow allows the total water quantity of the engine to be provided to the EGR cooler as a result of the large cross-section through which the flow takes place. In addition, in contrast to a longitudinal through-flow, the water experiences a considerably lower temperature increase. Due to its operating principle, this system is ideal with respect to the cooling action and the pressure loss on the part of the water.

The problem with such systems is that the EGR cooler insert is not completely enclosed by the contour of the water pocket in the crankcase. As a result, a lot of water flows around the EGR cooler, which reduces the flow velocities through the cooler lamellae, thereby decreasing the cooling action.

SUMMARY

The present disclosure described hereafter addresses this problem. The goal was to conduct water through the cooler, and to minimize the leakage losses. At the same time, it was to be possible to implement the approach without additional costs, to the extent possible, in terms of manufacturing and assembly.

It is an object of the present disclosure to simplify the mounting of the exhaust gas recirculation device, in particular of the distribution line, to the internal combustion engine, and to enhance the cooling action.

The present disclosure provides an internal combustion engine including a crankcase and a cylinder head, including at least one cylinder block, at least one planar flange surface for accommodating at least one cooler, at least one cooler, at least one coolant inlet to the cooler, at least one coolant outlet from the cooler, at least one exhaust gas inlet to the cooler, at least one integrated exhaust gas feedthrough from the cooler, and at least one internal cooling section.

In the process, it is advantageous that the internal combustion engine has an extremely compact design, and that the heat transfer may take place extremely effectively without unnecessary piping.

In one refinement of the present disclosure, the cooling section includes turbulence generators, which ensure even better heat transfer.

In another embodiment of the present disclosure, diaphragms and/or throttle devices are inserted into the channels. These components allow an individual adjustment of the exhaust gas quantity supplied to the individual cylinder units.

On the one hand, cast fins are provided on the inlet connectors of the EGR cooler, and on the other hand, cast ribs are inserted into the crankcase pocket. The cast ribs in the crankcase are brought to the cast fins of the EGR cooler except for a small gap, as is shown in FIG. 1. In this way, the leakage cross-section is drastically reduced, except for the remaining gap. To reduce the tolerance-induced variance of the gap width, and thus the range of the throttle action, the cast ribs are processed on the crankcase side. In the process, only little material is machined due to the small rib width, and the processing time of the crankcase is thus increased only little. The cast ribs at the EGR cooler, in contrast, do not have to be processed since the tolerances are already sufficiently precise during die-casting.

Using this approach, the leakage losses are reduced to a minimum. Conversely, the flow velocities and thus the cooling action at the EGR cooler are considerably increased or improved.

If thereafter the rear-side cast rib in the crankcase is continued across the entire length of the EGR cooler, the additional baffle plate at the rear side of the EGR cooler may be dispensed with. This results in cost savings, which likely compensate for the additional costs for processing the ribs at the crankcase.

Due to the option of being able to adapt the processing at the crankcase at any time, it is additionally possible to respond to design changes of the EGR cooler at any time.

BRIEF DESCRIPTION OF THE DRAWINGS

Further advantageous embodiments of the present disclosure may be derived from the description of the drawings, in which exemplary embodiments of the present disclosure shown in the figures are described in greater detail.

DETAILED DESCRIPTION

Figure 1:
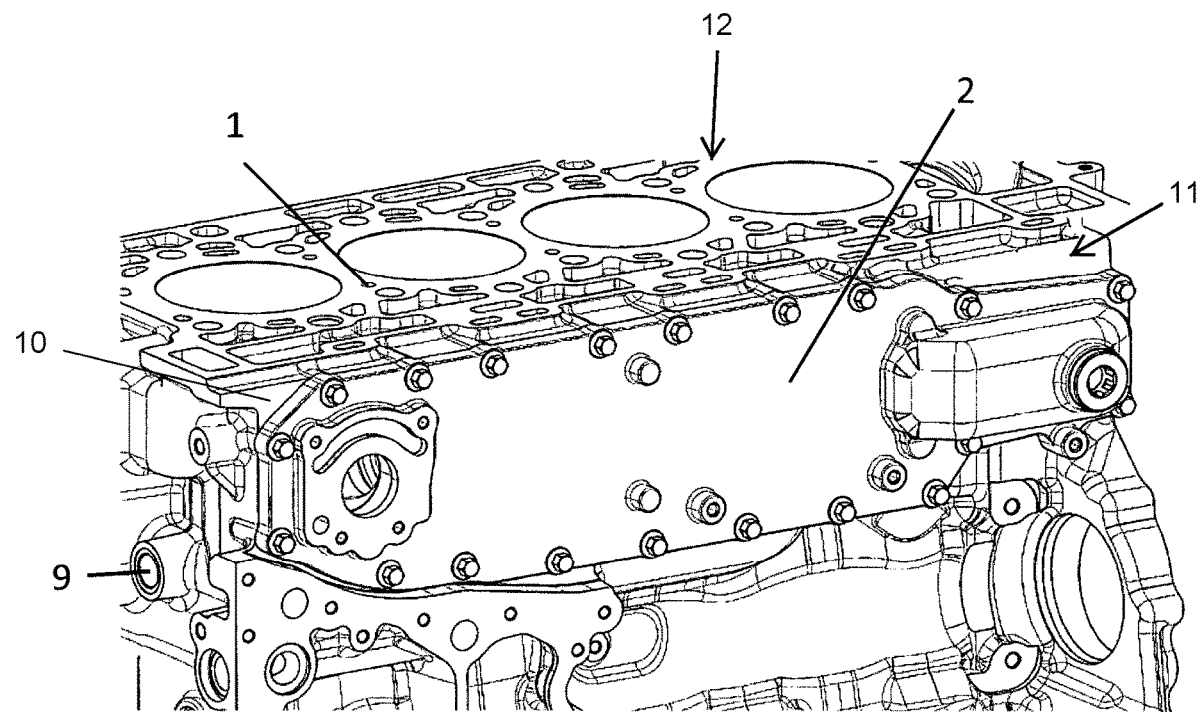
FIG. 1 shows a perspective view of a crankcase including a cooling housing of an exhaust gas cooler of an exhaust gas recirculation device which is integrated into the crankcase.

FIG. 1 shows a cylinder block 12 of a crankcase 1 of an internal combustion engine, which includes a planar flange surface for accommodating the EGR cooler 2 at its longitudinal side 11. A coolant inlet opening 9, which allows coolant to pass through to cooler 2, is provided in the sealing plane of the planar flange surface 10 in the area of an end face of the internal combustion engine. In the immediate vicinity of coolant inlet opening 9, the coolant outlet opening of cooler 2 is also situated in the sealing plane of the flange surface. An exhaust gas inlet to the cooler, which allows exhaust gases to pass to the cooler, is provided in the sealing plane of the planar flange surface 10 in the area of the other end face of the internal combustion engine. In the immediate vicinity of the exhaust gas inlet to the cooler, the integrated exhaust gas feedthrough from the cooler is also situated in the sealing plane of the flange surface. The internal cooling section includes nose-shaped elevations, which in cooperation with flow guide elements situated at the cooler housing ensure a turbulent flow of the coolant flowing around or between the nose-shaped elevations and the flow guide elements. The gas withdrawal from the cylinder head takes place via the channel design in the cylinder head and is passed on via the exhaust gas inlet opening to the exhaust gas inlet with the aid of a channel connection in crankcase 1. The exhaust gas reaching the exhaust gas inlet is introduced into the EGR line guidance in cooler 2, where it gives off its waste heat to the coolant. Thereafter, the cooled exhaust gas leaves cooler 2 with the aid of the integrated exhaust gas feedthrough through crankcase 1 in the direction of the exhaust gas system. A gasket is situated between EGR cooler 2 and the flange surface.

Figure 2:
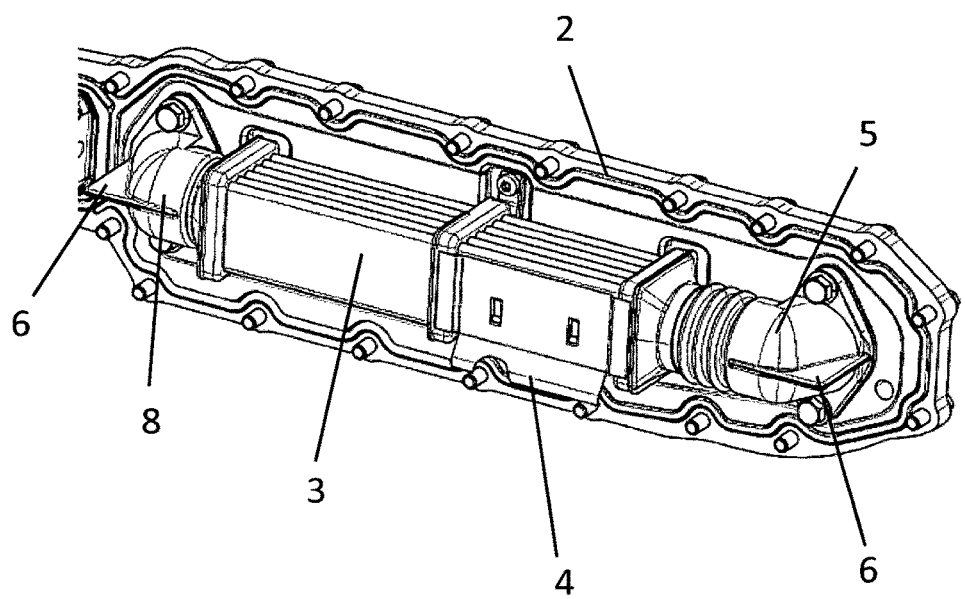
FIG. 2 shows a side view of the EGR cooler according to FIG. 1.

FIG. 2 shows a side view of EGR cooler 2 according to FIG. 1 mounted in crankcase 1. This EGR cooler 2 includes a cooler cassette 3, which acts as a cooling section. A baffle plate 4 is provided to assist the cooling section of cooler cassette 3. From the view of the exhaust gas flow direction, a respective inlet connector 5 and outlet connector 8 are situated upstream and downstream from cooler cassette 3. Inlet connector 5 of EGR cooler 2 includes a cast fin 6. Outlet connector 8 of EGR cooler 2 includes a cast fin 6.

Figure 3:
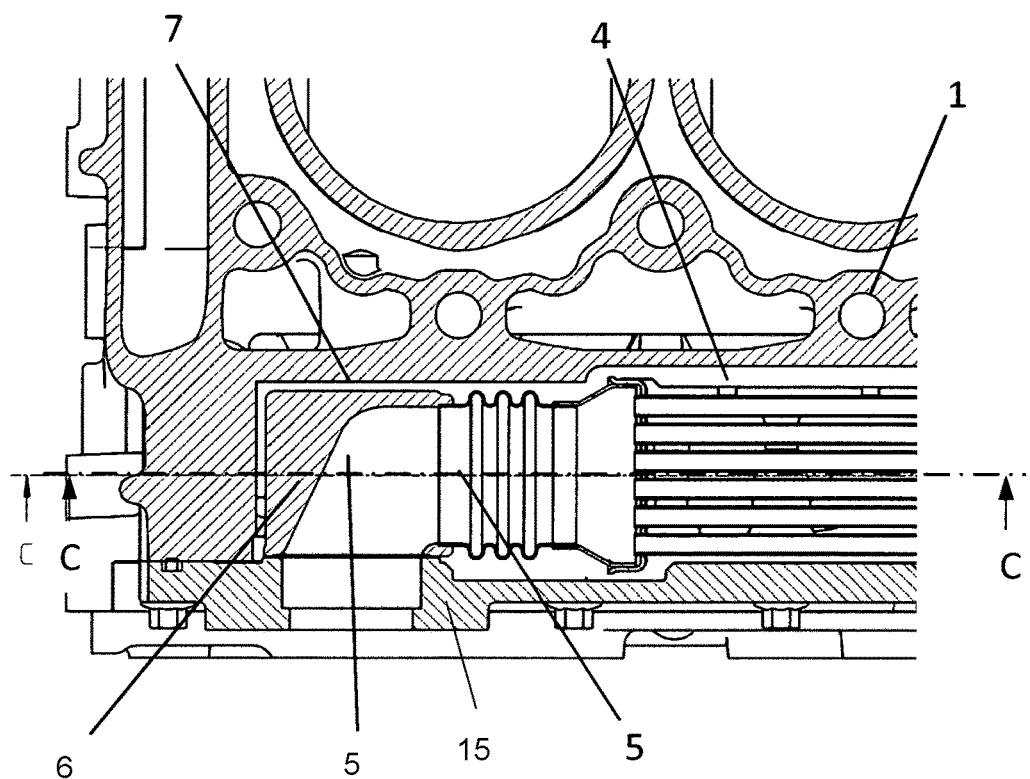
FIG. 3 shows a sectional view through the crankcase from FIG. 1 including an EGR cooling housing whose base body is an integral part of the crankcase, the base body being covered by a cover.

FIG. 3 shows a sectional view through crankcase 1 from FIG. 1 including an EGR cooler 2 in a cooling housing whose base body is an integral part of crankcase 1, the base body being covered by a cover 16 which is screwed to crankcase 1. Baffle plate 4, around which cooling water also flows, is situated at the cooling section of EGR cooler 2 around which the cooling water of the internal combustion engine flows. Cast fin 6 around which the cooling water of the internal combustion engine flows is visible at the inlet connector of EGR cooler 2. Opposite cast fin 6 of EGR cooler 2, cast rib 7 situated at crankcase 1 of the internal combustion engine is visible. The arrangement of cast fin 6 to cast rib 7 results in a gap in the area of EGR cooler 2 which extends in the cooling water in the installed state, which has influence on the flow velocity of the cooling water.

Figure 4:
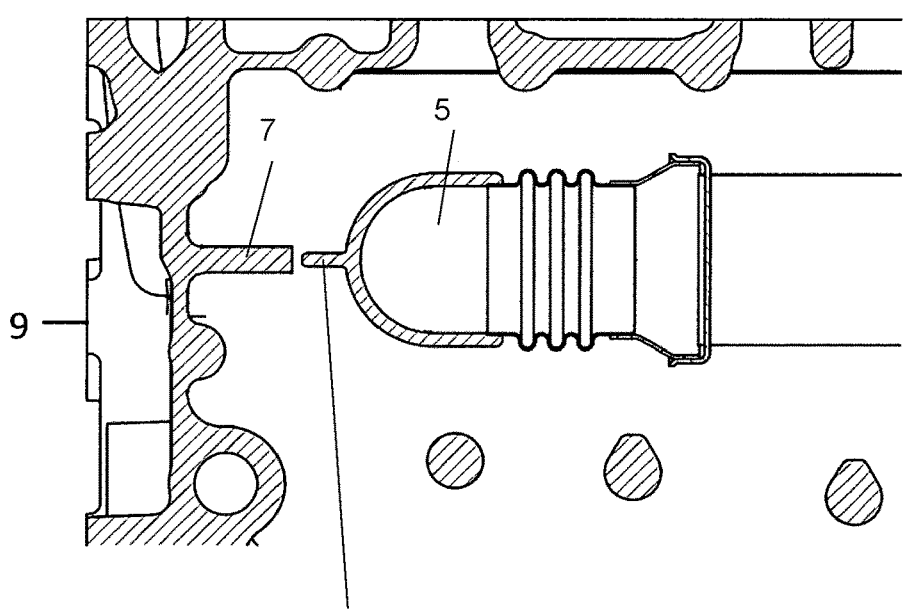
FIG. 4 shows a sectional view through the crankcase along line C-C from FIG. 3.

FIG. 4 shows a sectional view through crankcase 1 along line C-C from FIG. 3. Here, it becomes apparent again how the arrangement of cast fin 6 at inlet connector 5, in combination with cast rib 7 situated at crankcase 1 of the internal combustion engine, influences the flow conditions of the cooling water.

Figure 5:
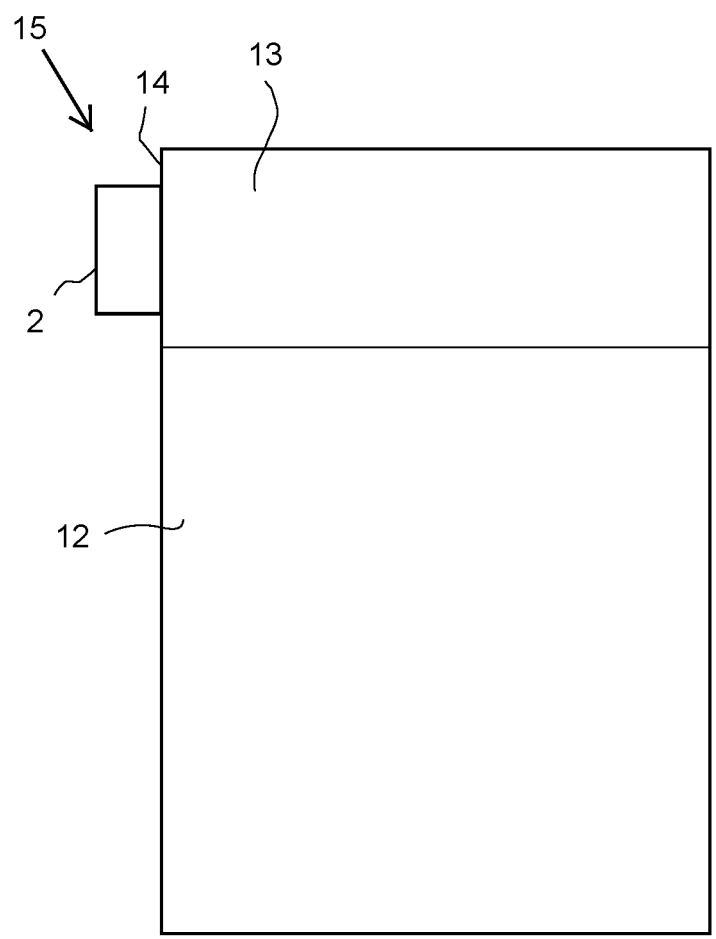
FIG. 5 shows an embodiment where the cooler is at a planar surface of the cylinder head.

FIG. 5 illustrates a further embodiment, schematically showing a side view illustrating a planar flange surface 14 essentially situated at a longitudinal side 15 of the cylinder head 13 for accommodating the EGR cooler 2.

LIST OF REFERENCE NUMERALS 1 crankcase
2 EGR cooler
3 cooler cassette
4 baffle plate
5 inlet connector
6 cast fin
7 cast rib
8 outlet connector
9 coolant inlet opening
10 planar flange surface of crankcase
11 longitudinal side of crankcase
12 cylinder block
13 cylinder head
14 planar flange surface of cylinder head
15 longitudinal side of cylinder head
16 cover

What is claimed is:

1. An internal combustion engine comprising:
   a crankcase including a cylinder block;
   a cylinder head;
   a cooler configured for cooling recirculated exhaust gas and having a length defining a lengthwise direction;
   a planar flange surface for accommodating the cooler;
   a coolant inlet to the cooler;
   a coolant outlet from the cooler;
   an exhaust gas inlet to the cooler; and
   an integrated exhaust gas feedthrough from the cooler,
   the cooler including an internal cooling section,
   the cooler including an inlet connector and an outlet connector, the internal cooling section being between the inlet connector and the outlet connector,
   the cooler and/or the crankcase including a diaphragm and/or throttle device between the internal cooling section and the crankcase,
   the diaphragm and/or throttle device:
      being connected to an outer surface of the inlet connector and/or the outlet connector and protruding away from the outer surface of the inlet connector and/or
      the outlet connector in a lengthwise direction of the cooler, and/or
      being connected to the crankcase and including a section protruding away from the crankcase in the lengthwise direction of the cooler.

2. The internal combustion engine as recited in claim 1, wherein the internal cooling section includes turbulence generators.

3. The internal combustion engine as recited in claim 1, wherein the coolant inlet to the cooler is configured to be regulatable and the exhaust gas inlet to the cooler is configured to be regulatable.

4. The internal combustion engine as recited in claim 1, wherein the planar flange surface is situated on a longitudinal side of the crankcase for accommodating the cooler.

5. The internal combustion engine as recited in claim 1, wherein the diaphragm and/or throttle device is a cast fin connected to the outer surface of the inlet connector and/or the outlet connector and protruding away from the outer surface of the inlet connector and/or the outlet connector in a lengthwise direction of the cooler.

6. The internal combustion engine as recited in claim 1, wherein the planar flange surface is situated at a longitudinal side of the cylinder head for accommodating the cooler.

7. The internal combustion engine as recited in claim 1, wherein the diaphragm and/or throttle device is a cast rib connected the crankcase and including a portion protruding away from the crankcase in the lengthwise direction of the cooler.

8. The internal combustion engine as recited in claim 7, wherein the internal cooling section and the crankcase each include a diaphragm and/or throttle device between the internal cooling section and the crankcase, including:
   a diaphragm and/or throttle device connected to an outer surface of the inlet connector and/or the outlet connector and protruding away from the outer surface of the inlet connector and/or the outlet connector in the lengthwise direction of the cooler; and
   a diaphragm and/or throttle device connected to the crankcase and including a section protruding away from the crankcase in the lengthwise direction of the cooler.

9. The internal combustion engine as recited in claim 8, wherein the diaphragm and/or throttle device connected to an outer surface of the inlet connector and/or the outlet connector is a cast fin connected to the outer surface of the inlet connector and/or the outlet connector and protruding away from the outer surface of the inlet connector and/or the outlet connector in a lengthwise direction of the cooler, and the diaphragm and/or throttle device connected to the crankcase is a cast rib connected the crankcase and including a section protruding away from the crankcase in the lengthwise direction of the cooler.

10. An internal combustion engine comprising:
a crankcase including a cylinder block;
a cylinder head; and
a cooler configured for cooling recirculated exhaust gas, the cooler including an internal cooling section, the cooler being fastened to a planar flange surface of the cylinder block,
the cooler includes an inlet connector and an outlet connector arranged and configured such that the recirculated exhaust gas flows through the inlet connector into the internal cooling section and then out of the outlet connector,
one of the inlet connector or the outlet connector including a first fin protruding away from an outer surface of one of the inlet connector and the outlet connector in a lengthwise direction of the cooler.

11. The internal combustion engine as recited in claim 10, wherein the internal cooling section is housed inside of a cooling housing having a base body that is an integral part of the crankcase.

12. The internal combustion engine as recited in claim 11, wherein the crankcase includes a cast rib including a first portion arranged directly across from the first fin to define a gap for influencing a flow velocity of cooling water, the first portion directly facing the first fin and extending away from the base body in the lengthwise direction of the cooler toward the first fin.

13. The internal combustion engine as recited in claim 10, wherein the cooler includes a cover fastened to the crankcase by screws.

14. The internal combustion engine as recited in claim 10, wherein the other of the inlet connector or the outlet connector includes a second fin protruding away from an outer surface of the other of the inlet connector and the outlet connector in the lengthwise direction of the cooler away from the first fin.

15. An internal combustion engine comprising:
a crankcase including a cylinder block;
a cylinder head; and
a cooler configured for cooling recirculated exhaust gas, the cooler including an internal cooling section, the cooler being fastened to a planar flange surface of the cylinder block,
the internal cooling section is housed inside of a cooling housing having a base body that is an integral part of the crankcase,
the cooler including an inlet connector and an outlet connector,
the crankcase including a cast rib including a first portion, the first portion facing one of the inlet connector and the outlet connector and extending away from the base body in a direction of the inlet connector and the outlet connector.

16. The internal combustion engine as recited in claim 15, the cast rib including a second portion, the second portion facing the other of the inlet connector and the outlet connector and extending away from the base body in a direction of the inlet connector and the outlet connector.

17. The internal combustion engine as recited in claim 16 wherein the cast rib includes a third portion extending along a length of the base body between the first portion and the second portion.

18. The internal combustion engine as recited in claim 15 wherein the cooler includes a first fin directly facing the first portion of the cast rib, the first fin protruding away from an outer surface of one of the inlet connector and the outlet connector in a lengthwise direction of the cooler toward the first portion of the cast rib.

19. The internal combustion engine as recited in claim 18 wherein the cooler includes a second fin protruding away from an outer surface of the other of the inlet connector and the outlet connector in the lengthwise direction of the cooler.

20. The internal combustion engine as recited in claim 19, the cast rib including a second portion, the second portion facing the other of the inlet connector and the outlet connector and extending away from the base body in a direction of the inlet connector and the outlet connector,
the second fin directly facing the second portion of the cast rib, the second fin protruding away from the outer surface of one of the inlet connector and the outlet connector in the lengthwise direction of the cooler toward the second portion of the cast rib.

\* \* \* \* \*